(12) United States Patent
Mills et al.

(10) Patent No.: US 9,130,889 B2
(45) Date of Patent: *Sep. 8, 2015

(54) DISTRIBUTED CACHE—ADAPTIVE MULTICAST ARCHITECTURE FOR BANDWIDTH REDUCTION

(71) Applicant: ViaSat, Inc., Carlsbad, CA (US)

(72) Inventors: Raymond L. Mills, Calhan, CO (US); Erwin C. Hudson, Centennial, CO (US)

(73) Assignee: ViaSat, Inc., Carlsbad, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/924,220

(22) Filed: Jun. 21, 2013

(65) Prior Publication Data

US 2014/0025783 A1 Jan. 23, 2014

Related U.S. Application Data

(63) Continuation of application No. 13/186,270, filed on Jul. 19, 2011, now Pat. No. 8,493,881, which is a continuation of application No. 12/554,585, filed on Sep. 4, 2009, now Pat. No. 8,000,259.

(51) Int. Cl.
*H04L 12/26* (2006.01)
*H04L 12/927* (2013.01)
(Continued)

(52) U.S. Cl.
CPC .......... *H04L 47/806* (2013.01); *H04L 12/1886* (2013.01); *H04L 43/0894* (2013.01); *H04L 67/1097* (2013.01)

(58) Field of Classification Search
USPC ................. 370/252, 395.5–395.52, 400–401, 370/464–465, 468, 477
See application file for complete search history.

(56) References Cited

U.S. PATENT DOCUMENTS 4,041,397 A 8/1977 Bauer et al.
4,287,598 A 9/1981 Langseth et al.
(Continued)

FOREIGN PATENT DOCUMENTS

EP 0762637 A2 3/1997
EP 0837569 A2 4/1998
(Continued)

OTHER PUBLICATIONS

Cable Television Laboratories, Inc., Data Over Cable Service Interface Specifications DOCSIS 3.0: Physical Layer Specification, CM-SP-PHYv3.0-I07-080522, May 22, 2008. CableLabs, 170 pgs.
(Continued)

*Primary Examiner* — Frank Duong
(74) *Attorney, Agent, or Firm* — Holland & Hart LLP (57) ABSTRACT

Disclosed is a method and system for maximizing the use of available bandwidth on an ISP communication system between an Internet Service Provider (ISP) and remote locations where at least one of the remote locations has a remote cache. An embodiment may create a pool of the cacheable objects being sent to the remote locations from the downstream traffic. An embodiment may determine bandwidth savings for each object in the pool of cacheable objects that would be achieved by remotely caching each object and prioritize the pool of cacheable objects based on the determined bandwidth savings for each object. An embodiment may create a queue of objects to multicast to the remote caches based on the pool of cacheable objects and the remaining multicast bandwidth and then multicast the queue to the remote caches. The remote caches may intercept and reply to requests for objects held in the remote cache without accessing the ISP communication system, thus, saving bandwidth on the ISP communication system.

20 Claims, 7 Drawing Sheets

(51) Int. Cl.
*H04L 12/18* (2006.01)
*H04L 29/08* (2006.01)

(56) References Cited

U.S. PATENT DOCUMENTS

| | | | |
|---|---|---|---|
| 4,858,229 A | 8/1989 | Rosen et al. |
| 4,910,792 A | 3/1990 | Takahata et al. |
| 5,465,410 A | 11/1995 | Hiben et al. |
| 5,550,550 A | 8/1996 | Das |
| 5,839,050 A | 11/1998 | Baehr et al. |
| 5,987,233 A | 11/1999 | Humphrey |
| 5,991,306 A | 11/1999 | Burns et al. |
| 5,991,622 A | 11/1999 | Henry, Jr. |
| 6,047,171 A | 4/2000 | Khayrallah et al. |
| 6,169,513 B1 | 1/2001 | Cohen |
| 6,205,481 B1 | 3/2001 | Heddaya et al. |
| 6,243,760 B1 | 6/2001 | Armbruster et al. |
| 6,427,172 B1 | 7/2002 | Thacker et al. |
| 6,434,609 B1 | 8/2002 | Humphrey |
| 6,442,598 B1 | 8/2002 | Wright et al. |
| 6,546,488 B2 | 4/2003 | Dillon et al. |
| 6,601,090 B1 | 7/2003 | Gurijala et al. |
| 6,618,751 B1 | 9/2003 | Challenger et al. |
| 6,658,463 B1 | 12/2003 | Dillon et al. |
| 6,678,791 B1 | 1/2004 | Jacobs et al. |
| 6,763,006 B1 | 7/2004 | Lockett |
| 6,879,808 B1 | 4/2005 | Nations et al. |
| 6,947,440 B2 | 9/2005 | Chatterjee et al. |
| 7,039,683 B1 | 5/2006 | Tran et al. |
| 7,289,062 B2 | 10/2007 | Hudson et al. |
| 7,359,395 B2 | 4/2008 | Toporek et al. |
| 7,516,236 B2 | 4/2009 | Walsh et al. |
| 7,773,942 B2 | 8/2010 | Hudson et al. |
| 8,000,259 B2 | 8/2011 | Mills et al. |
| 8,149,761 B2 | 4/2012 | Hudson et al. |
| 8,411,798 B2 | 4/2013 | Sahai et al. |
| 8,538,328 B2 | 9/2013 | Mills et al. |
| 8,660,142 B2 | 2/2014 | Sahai |
| 8,730,086 B2 | 5/2014 | Mills |
| 2001/0052015 A1 | 12/2001 | Lin et al. |
| 2002/0006116 A1 | 1/2002 | Burkhart |
| 2002/0073167 A1 | 6/2002 | Powell et al. |
| 2002/0143984 A1 | 10/2002 | Hudson Michel |
| 2004/0224633 A1 | 11/2004 | Coromina et al. |
| 2007/0037512 A1 | 2/2007 | Godwin |
| 2008/0055151 A1 | 3/2008 | Hudson et al. |
| 2008/0055152 A1 | 3/2008 | Hudson et al. |
| 2008/0055153 A1 | 3/2008 | Hudson et al. |
| 2008/0056176 A1 | 3/2008 | Hudson et al. |
| 2008/0056189 A1 | 3/2008 | Hudson et al. |
| 2008/0320151 A1 | 12/2008 | McCanne et al. |
| 2010/0052919 A1 | 3/2010 | Mills |
| 2010/0062706 A1 | 3/2010 | Mills et al. |
| 2010/0074275 A1 | 3/2010 | Sahai |
| 2010/0112974 A1 | 5/2010 | Sahai et al. |

FOREIGN PATENT DOCUMENTS

| | | |
|---|---|---|
| GB | 1223163 A | 2/1971 |
| WO | WO-9918678 A1 | 4/1999 |
| WO | WO-9963711 A1 | 12/1999 |
| WO | WO-0046682 A1 | 8/2000 |
| WO | WO-2004002016 A2 | 12/2003 |
| WO | WO-2005067367 A2 | 7/2005 |
| WO | WO-2008027974 A2 | 3/2008 |

OTHER PUBLICATIONS

European Telecommunications Standards Institute, Digital Video Broadcasting (DVB); Second Generation Framing Structure, Channel Coding and Modulation Systems for Broadcasting, Interactive Services, News Gathering and Other Broadband Satellite Applications, Draft ETSI EN 302 307 v1.1.1 (Jun. 2004). Sophia Antipolis Cedex, France, 74 pgs.

European Telecommunications Standards Institute, Digital Video Broadcasting (DVB); Second Generation Framing Structure, Channel Coding and Modulation Systems for Broadcasting, Interactive Services, News Gathering and Other Broadband Satellite Applications, ETSI EN 302 307 v1.1.2 (Jun. 2006), Sophia Antipolis Cedex, France 74 pgs.

ISA/EPO, International Search Report and Written Opinion of the International Searching Authority; Int'l Patent App. No. PCT/US2007/077124, Jul. 22, 2008, European Patent Office, Rijswijk, NL 17pgs.

Yukitsuna, F., Satellite Repeater, JP Pub. No. 63185129 A2, Published Jul. 30, 1988, Abstract only, https://www.delphion.com/details?pn=JP63185129A2, downloaded Mar. 24, 2010, 1 pg.

Susumu, U. et al., Network Diversity System, JP Pub. No. 63179629 A2, Published Jul. 23, 1988, Abstract only, https://www.delphion.com/details?pn=JP63179629A2, downloaded Mar. 24, 2010, 1 pg.

U.S. Appl. No. 61/091,984, filed Aug. 26, 2008.
U.S. Appl. No. 61/095,979, filed Sep. 11, 2008.
U.S. Appl. No. 61/100,206, filed Sep. 25, 2008.
U.S. Appl. No. 60/840,809, filed Aug. 29, 2007.

DISTRIBUTED CACHE—ADAPTIVE MULTICAST ARCHITECTURE FOR BANDWIDTH REDUCTION

CROSS REFERENCE TO RELATED APPLICATIONS

This application is a continuation of U.S. patent application Ser. No. 13/186,270, entitled DISTRIBUTED CACHE—ADAPTIVE MULTICAST ARCHITECTURE FOR BANDWIDTH REDUCTION, filed Jul. 19, 2011; which is a continuation of U.S. non-provisional application Ser. No. 12/554,585, filed Sep. 4, 2009, entitled "Distributed Cache—Adaptive Multicast Architecture for Bandwidth Reduction," all of which are specifically incorporated herein by reference for all that they disclose and teach.

BACKGROUND OF THE INVENTION

Internet Service Providers (ISPs) provide access to the Internet for clients of the ISPs. Direct access by each Internet user to the Internet backbone is not typically implemented as a direct connection to the Internet backbone because such a direct connection is expensive and is generally limited in geographical availability. Also, controlling the number and ownership of direct connections to the Internet backbone is used by ISPs to discourage security threats to the Internet.

With respect to connections between the ISP and the ISP clients, typically, an ISP provides a private/proprietary communication system to connect ISP clients to the ISP. Further, the ISP maintains one or more direct connections to the public Internet and provides the bridge connection between the public Internet and the private/proprietary communication system connecting the ISP to the ISP clients. The direct connections to the Internet are implemented, many times, via a wired system with sufficient bandwidth that the aggregate data usage of the ISP clients is not limited by the ISP connections to the Internet. However, the bandwidth of the communication system connecting the ISP to the clients has generally been bandwidth limited.

In the early days of Internet use, a typical communication system connecting the ISP to the ISP clients used phone modems that, eventually, operated up to 56 kbps (kilo bits per second). As the popularity of the Internet increased, a desire for faster client connections also increased. Thus, many ISPs began to provide "broadband" access in the 256 kbps to 1 Mbps (mega bits per second), or greater, speed ranges between the ISP and the ISP client. With time, the available "broadband" speeds increased to a typical current speed of 5-6 Mbps with speeds of 20 Mbps or higher available from some ISPs. Some of the typical "broadband" communication systems include: satellite based communications, cable modem based communications (i.e., based on the cable television connections already in place), and Digital Subscriber Line (DSL) technology.

While "broadband" connections made ISP client access to the Internet significantly faster than the prior phone modem technology, the communication system connection between the ISP and the ISP client still remained a significant bottleneck in the potential speed of access for ISP clients. Depending on the technology, the bandwidth (effective size of the communication pipe between the ISP and the ISP client) was shared between multiple clients and the usage of one client could adversely affect other clients. For other "broadband" technologies, the communication speed in "bits per second" was relatively fast, but due to the connection medium and signal travel distance, a significant amount of the response time between requesting a web page and receiving the web page at the ISP client location was due to the time latency needed for the signal to travel the full signal travel distance to and from the ISP and not as much for the actual communication speed in "bits per second."

SUMMARY OF THE INVENTION

An embodiment of the present invention may comprise a computerized method for maximizing use of communication bandwidth on an ISP communication system connecting at least one remote location to an Internet Service Provider (ISP), the ISP communication system having a maximum total downstream bandwidth available to transmit objects downstream from the ISP to the at least one remote location, the at least one remote location having a remote cache, the computerized method comprising: determining a bandwidth savings from remote caching for each requested object in a pool of cacheable objects as a function of a delivery cost/size of each requested object, a Time To Live (TTL)/expiry time of each requested object, and a frequency of request for each requested object, the pool of cacheable objects being requested objects contained in downstream unicast replies of downstream unicast communication traffic of the ISP communication system; prioritizing the requested objects in the pool of cacheable objects based on the determined bandwidth savings for each requested object in the pool of cacheable objects; determining a sub-group of the requested objects in the pool of cacheable objects to place in a queue of multicast cacheable objects to multicast to the remote cache at the at least one remote location based on the prioritized pool of cacheable objects and an available downstream multicast bandwidth; delivering objects in the queue of multicast cacheable objects to the remote cache at the at least one remote location via multicast transmissions downstream from the ISP to the remote location; intercepting requests sent upstream from the at least one remote location for objects contained in the remote cache at the remote cache; and responding to the intercepted requests by the remote cache at the at least one remote location with replies containing the requested objects contained in the remote cache such that upstream and downstream bandwidth on the ISP communication system is saved by excluding upstream requests for, and downstream replies containing, the requested objects contained in the remote cache.

An embodiment of the present invention may further comprise a distributed cache adaptive multicast system for maximizing use of communication bandwidth on an ISP communication system connecting at least one remote location to an Internet Service Provider (ISP), the ISP communication system having a maximum total downstream bandwidth available to transmit objects downstream from the ISP to the at least one remote location, the at least one remote location having a remote cache, the distributed cache adaptive multicast system comprising: a prioritizer subsystem that determines a bandwidth savings from remote caching for each requested object in the pool of cacheable objects as a function of a delivery cost/size of each requested object, a Time To Live (TTL)/expiry time of each requested object, and a frequency of request for each requested object, the pool of cacheable objects being requested objects contained in downstream unicast replies of downstream unicast communication traffic of the ISP communication system, and that prioritizes the requested objects in the pool of cacheable objects based on the determined bandwidth savings for each requested object in the pool of cacheable objects; a multicast queue subsystem that determines a sub-group of the requested objects in the pool of cacheable objects to place in a queue of multicast cacheable objects to multicast to the remote cache at the at least one remote location based on the prioritized pool of cacheable objects and the available downstream multicast bandwidth; and a multicast delivery subsystem that delivers objects in the queue of multicast cacheable objects to the remote cache at the at least one remote location via multicast transmissions downstream from the ISP to the remote location in order to permit the at least one remote cache to intercept requests sent upstream from the at least one remote location for objects contained in the remote cache at the remote cache, and to respond to the intercepted requests by the remote cache at the at least one remote location with replies containing the requested objects contained in the remote cache such that upstream and downstream bandwidth on the ISP communication system is saved by excluding upstream requests for and downstream replies containing the requested objects contained in the remote cache.

An embodiment of the present invention may further comprise a distributed cache adaptive multicast system for maximizing use of communication bandwidth on an ISP communication system connecting at least one remote location to an Internet Service Provider (ISP), the ISP communication system having a maximum total downstream bandwidth available to transmit objects downstream from the ISP to the at least one remote location, the at least one remote location having a remote cache, the distributed cache adaptive multicast system comprising: means for determining a bandwidth savings from remote caching for each requested object in the pool of cacheable objects as a function of a delivery cost/size of each requested object, a Time To Live (TTL)/expiry time of each requested object, and a frequency of request for each requested object, the pool of cacheable objects being requested objects contained in downstream unicast replies of downstream unicast communication traffic of the ISP communication system; means for prioritizing the requested objects in the pool of cacheable objects based on the determined bandwidth savings for each requested object in the pool of cacheable objects; means for determining a sub-group of the requested objects in the pool of cacheable objects to place in a queue of multicast cacheable objects to multicast to the remote cache at the at least one remote location based on the prioritized pool of cacheable objects and the available downstream multicast bandwidth; means for delivering objects in the queue of multicast cacheable objects to the remote cache at the at least one remote location via multicast transmissions downstream from the ISP to the remote location; means for intercepting requests sent upstream from the at least one remote location for objects contained in the remote cache at the remote cache; and means for responding to the intercepted requests by the remote cache at the at least one remote location with replies containing the requested objects contained in the remote cache such that upstream and downstream bandwidth on the ISP communication system is saved by excluding upstream requests for, and downstream replies containing, the requested objects contained in the remote cache.

DETAILED DESCRIPTION OF THE EMBODIMENTS

Figure 1:
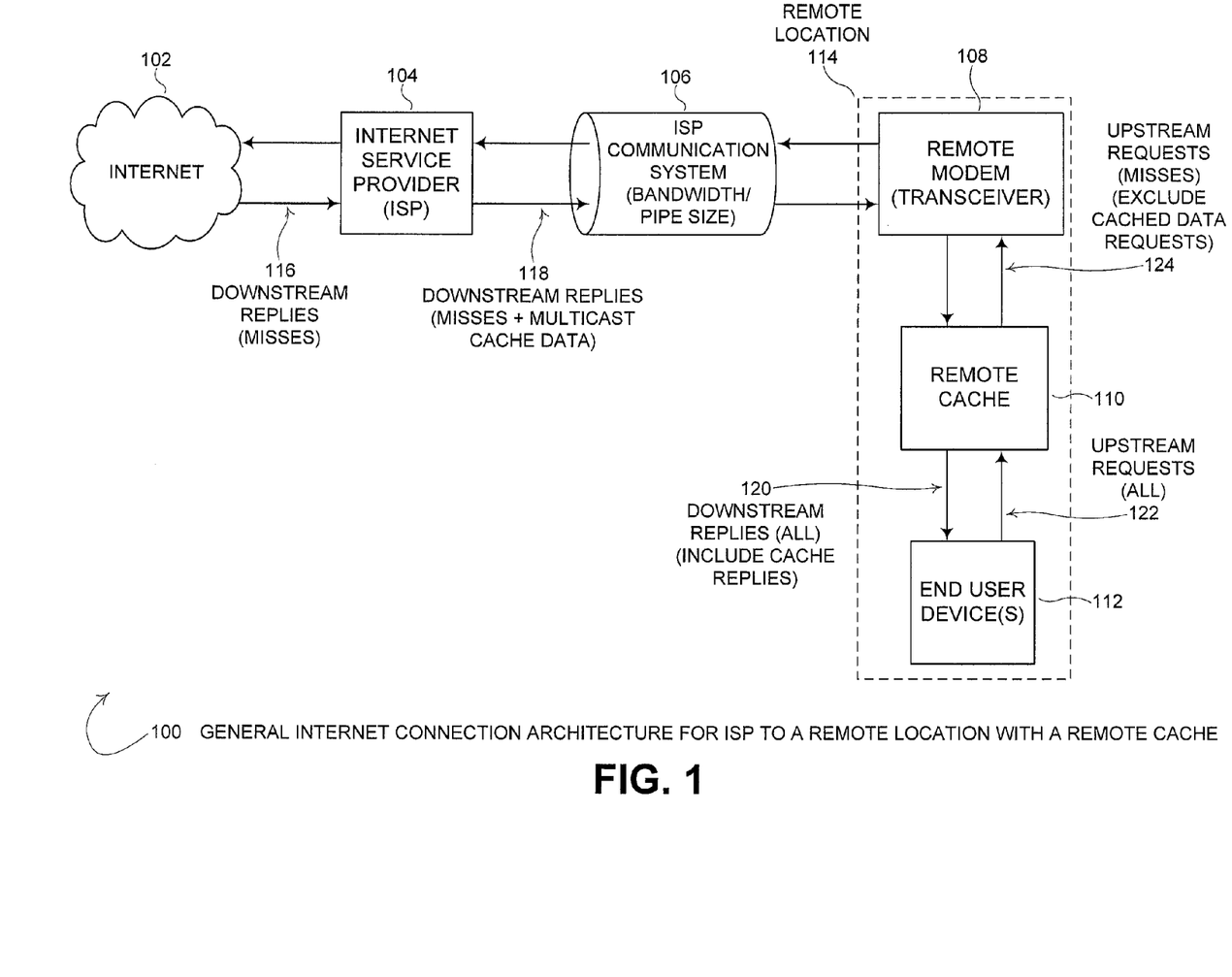
FIG. 1 is a schematic illustration of the general Internet connection architecture for connecting an Internet Service Provider (ISP) to a remote location having a remote cache.

FIG. 1 is a schematic illustration 100 of the general Internet connection architecture for connecting an Internet Service Provider (ISP) 104 to a remote location 108 having a remote cache 110. One or more Internet end user devices 112 may connect to the Internet 102 through an ISP 104. The Internet 102 is connected to the ISP 104 and connects to the remote location(s) 114 via the ISP communication system 106. The ISP communication system 106 may be limited in how much data may be delivered (typically measured in bits per second—bps). The schematic illustration 100 shown in FIG. 1 illustrates a single remote location 114, but various embodiments may have the ISP 104 concurrently connect to one more remote locations 114 via the ISP communication system 106. In other words, the ISP 104 connects to at least one remote location 114 via the ISP communication system 106. The ISP 104 operates as a communication bridge between the communication protocol used on the ISP communication system 106 and the communication protocol used to connect to the Internet 102. Accordingly, the equipment at the ISP 104 may include one or more computing devices capable of performing the communication bridge function, including both dedicated computing equipment as well as a general purpose computer containing computer instructions to perform the appropriate functions required of the ISP 104. The one or more computing devices making up the computer system performing the functions of the ISP 104 may include at least one computer readable storage medium that stores the necessary computer instructions to perform the operations of the ISP 104.

The remote location 114 may include a remote modem (transceiver) 108, a remote cache 110, and one or more end user devices 112 that access the Internet 102 through the ISP 104. One skilled in the art will recognize that the functions performed by the remote modem/transceiver 108, the remote cache 110 and/or the end user devices 112 may be combined together into a single device and/or two devices rather than three separate devices. One skilled in the art will also recognize that the remote cache 110 may be located before or after the remote modem/transceiver 108. The remote cache 110 as shown in FIG. 1 is located after the remote modem/transceiver 108 as it is anticipated that the cost for communication parts/devices operating on the networking protocols expected at the remote location (e.g., standard Ethernet) is less expensive and cumbersome to work with than for the communication parts/equipment designed to communicate on the ISP communication system 106 (e.g., satellite, cable, or Digital Subscriber Line—DSL), but this may not necessarily be true for all embodiments. Further, if the remote cache 110 and the remote modem/transceiver 108 are combined into a single device, it may make little difference in operation and/or part/equipment cost of the single device to place the remote cache 110 prior to the remote modem/transceiver 108 that converts the signal from the ISP communication system 106 into a signal commonly used for networking at an ISP client/remote location 114. Similar to the equipment utilized at the ISP 104, the equipment at the remote location 114 may include one or more computing devices to perform the functions of the remote modem/transceiver 108, the remote cache 110, and/or the end user devices 112. Computing devices capable of performing the appropriate functions at the remote location include both dedicated computing equipment as well as a general purpose computer containing computer instructions to perform the necessary operations at the remote location 114. The one or more computing devices making up the computer system performing the functions at the remote location 114 may include at least one computer readable storage medium that stores the necessary computer instructions to perform the operations of an embodiment at the remote location 114.

In the Internet connection architecture 100 shown in FIG. 1, the typical ISP communication system connection 106 is augmented by the addition of a remote cache 110 located at the remote location 114 of a user. The remote cache 110 stores/caches Internet objects (i.e., Internet data objects, data, items, etc.) at the remote location 114 so that the end user devices 112 at the remote location 114 may repeatedly request, receive, and utilize the objects stored in the remote cache 110 without the need to request or receive a reply from the Internet over the ISP communication system for each instance of a request by the end user devices 112 for a remotely cached object requested. As the remote cache 110 stores information, the one or more computing devices performing the functions of the remote cache 110 may necessarily include at least one computer readable storage medium to store the cached Internet objects. Various embodiments may utilize commercially available software to perform the functions of the remote cache 110 such as web or Hyper Text Transfer Protocol (HTTP) server software. For instance, an embodiment may utilize the open source Apache server software to perform the caching functions of the remote cache 110. Other embodiments may utilize the Internet Information Servers (IIS) web/HTTP software available from Microsoft Corporation or some other web/HTTP server software. Embodiments may combine the use of various web/HTTP server software applications such as Apache and IIS as desired by the system designer. Various embodiments may further connect at least one remote location that does not have/utilize a remote cache to the same ISP communication system 106 connecting to the one or more remote locations 114 having remote caches 110.

In operation, the end user devices 112 deliver all Internet data/information requests 122 upstream to the remote cache 110. The remote cache inspects all the upstream requests 122 from the end user devices 112 and returns downstream replies 120 with any information stored in the remote cache 120 without forwarding the request for the information to the ISP 104 over the ISP communication system 106. Upstream requests 122 from the end user devices 112 that request information found in the remote cache 110 may be referred to as upstream "hit" requests. Upstream requests 122 from the end user devices 112 that request information not found in the remote cache 110 may be referred to as upstream "miss" requests. Any of the upstream requests 122 from the end user devices 112 that "miss" and do not locate information in the remote cache 110 are sent as upstream requests 124 to the Internet 102 via the remote modem/transceiver 108, the ISP communication system 106 and the ISP 104. Necessarily, the upstream requests 124 for data "missed" in the remote cache 110 utilize the ISP communication system bandwidth 106 to communicate the information. After receiving the upstream requests 124 for the data missed by the remote cache 110, the Internet sends replies downstream 116 that will eventually be received by the requesting end user devices 112 at the remote location 114. The downstream replies 116 for the information missed at the remote cache 110 is delivered to the ISP 104. The ISP 104 then passes the downstream replies for the misses 116, 118 over the ISP communication system 106 to the remote location 114. The downstream "miss" replies 116 are typically unicast messages directed to each individual end user device/application 112 that has requested an object. Thus multiple end user devices/applications 112 at either a single or multiple remote locations 114 may request the same data object, but necessitate a separate unicast reply to be directed to each end user device/application 112. A unicast message is a message intended for and delivered to a single requesting application/device. The ISP 104 may also send multicast messages 118 including information that is to be stored by the remote cache 110 to the remote cache 110 concurrently with the downstream miss replies 116. By utilizing multicast technology, a single message may be transmitted to multiple remote caches 110 at multiple remote locations 114 instructing the remote caches 110 to store the attached multicast data 118. Thus, downstream bandwidth on the ISP communication system 106 used for delivering information to multiple remote caches 110 is minimized by the use of the multicast technology. Future requests for the same objects by other remote locations 114 may then also be responded to by the remote cache 110 for each remote additional remote location 114, also saving ISP communication system 106 bandwidth to permit more efficient bandwidth use by maximizing the ISP communication system 106 bandwidth. The remote cache 110 receives the downstream unicast miss replies combined with the multicast cache data 118 sent by the ISP 104. The remote cache 110 removes the multicast cache data from the downstream unicast miss replies and multicast data stream 118 and stores the associated data in the remote cache 110. The remote cache 110 then passes on the downstream unicast miss replies 116 along with replies for data objects found (i.e., "hit") in the remote cache 110 such that the downstream signal after the remote cache 110 includes all downstream replies 120 to all upstream requests from the end user devices 112.

The remote cache 110 effectively removes the need to send requests and receive replies for data stored in the remote cache 110 over the ISP communication system and/or the Internet. The more remote locations that implement a remote cache, the more requests and replies are not sent over the ISP communication system 106 and/or the Internet 102. Thus, the ISP communication system bandwidth usage is reduced (i.e., saved) and the system may operate more quickly/efficiently and/or may handle more traffic, at least from the perspective of the end user devices 112. While the typical limiting transmission system in the Internet connection for the end user devices 112 is the ISP communication system 106, the bandwidth savings from the use of the remote cache 110 also saves the same bandwidth on the connection between the ISP 104 and the Internet 102.

Figure 2:
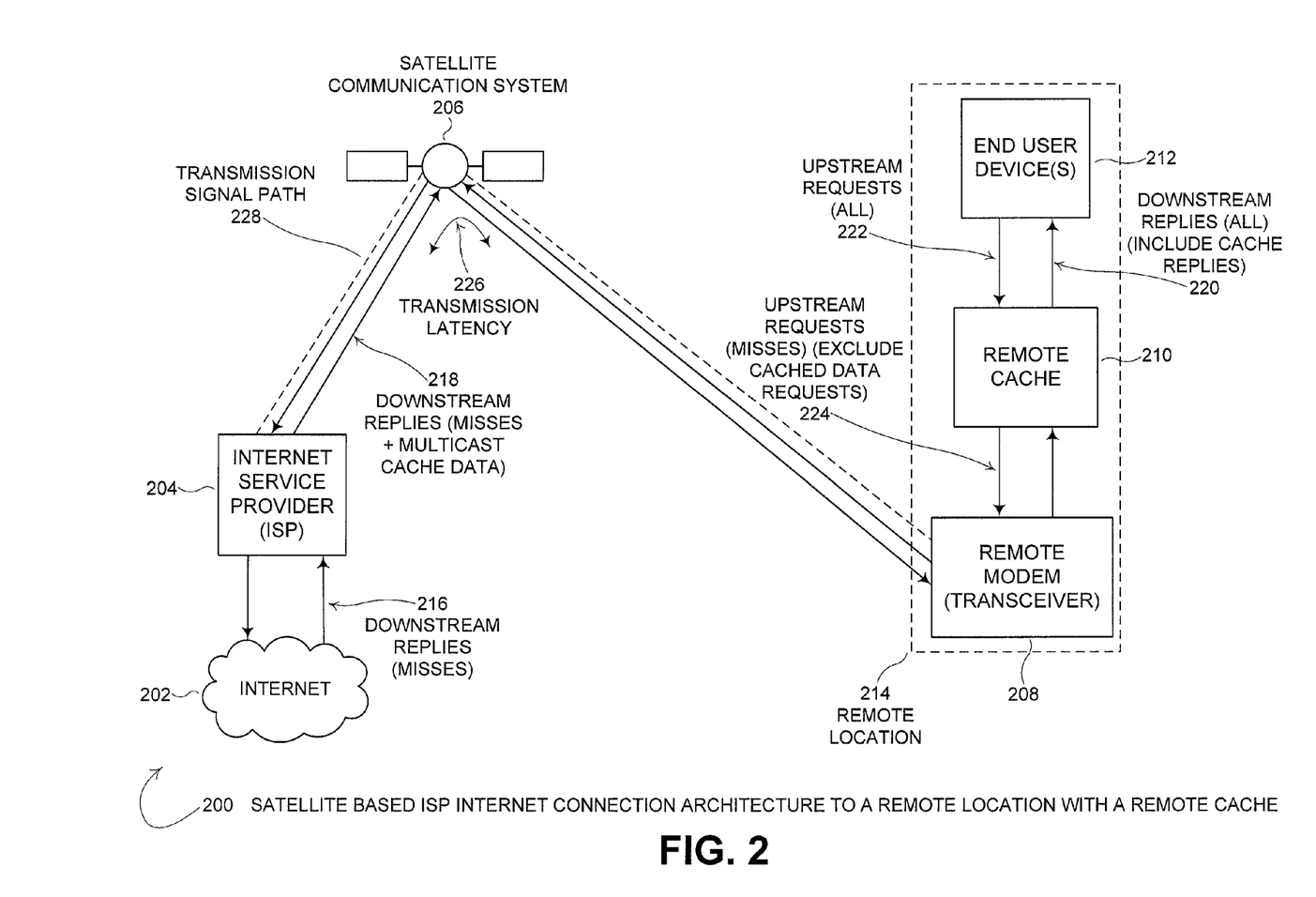
FIG. 2 is a schematic illustration of a satellite based ISP Internet connection architecture used to connect an ISP to a remote location having a remote cache.

FIG. 2 is a schematic illustration 200 of a satellite based ISP Internet connection architecture used to connect an ISP 206 to a remote location 214 having a remote cache 210. The embodiment illustrated 200 in FIG. 2 is a particular embodiment of the more general embodiment as disclosed with respect to and as illustrated 100 in FIG. 1 using satellite communication 206 as the ISP communication system 106. As with the general architecture described in the disclosure with respect to FIG. 1, the schematic illustration 200 in FIG. 2 shows a single remote location for simplicity when the architecture is capable of supporting one or many remote locations 214. The ISP 204 connects to the one or more remote locations 214 via the satellite communication system 206. Each remote location 214 connects to the satellite communication system 206 via a remote modem/transceiver 208, which is connected to the remote cache 210. The end user devices 212 may then be connected to the remote cache 210. As discussed in the disclosure with respect to FIG. 1, the remote cache 210 may be located either before or after the remote modem/transceiver 208 and/or the remote cache 210 may be combined into either the end user device 212 or the remote transceiver 208, both (208, 212) of which may also be combined into a single device, as desired by the system designer.

The remote cache 210 receives all upstream Internet data requests 222. The remote cache 210 replies to the end user devices 212 with data items requested in the upstream requests 222 that are included in the remote cache 210 as part of the data stream of all downstream replies 220 to end user device 212 upstream requests 222. If a data item requested 222 by the end user devices 212 is not found (i.e., missed) in the remote cache 210, the upstream requests for the misses 224 is sent to the remote modem/transceiver 208, where the upstream request misses 224 are transmitted via the satellite communication system 206 to the ISP 204 and eventually to the Internet 202. The Internet 202 replies to the upstream request misses 224 with downstream replies for the misses 216 containing the requested data objects for the upstream request misses 224. The ISP may then add multicast cache data to the downstream reply misses 216 and send the combined downstream reply misses and multicast cache data 218 to the one or more remote locations 214 via the satellite communication system 206. The remote cache 210 at each remote location 214 may then remove the multicast cache data 218 and store the multicast cache data in the remote cache 210. The downstream reply misses 216 may then be combined with the replies from the remote cache 210 for the requested data hits found in the remote cache such that the end user devices receive all downstream replies 220 to all upstream requests 222, including the replies from the remote cache 210 for data found in the remote cache 210 where the upstream request was not sent to the Internet 202, the ISP 204, or the satellite communication system 206.

As was described for the system disclosed with respect to FIG. 1, the bandwidth necessary to transmit upstream requests for and downstream replies containing data objects found in the remote cache 210 is saved when the remote cache 210 replies to a request rather than requiring transmission to and from the Internet 202 via the ISP 204. In addition to concerns with the "bits per second" bandwidth utilized to handle Internet data request and replies, a satellite communication system 206 also has a substantive transmission latency effect 226. Transmission of a signal up to and down from the satellite 206 over the transmission signal path 228 may take a half a second to a second or more. Thus, it may take one or more seconds (i.e., transmission latency 226) for an upstream request 224 to travel the length of the transmission signal path 228, regardless of the "bits per second" speed of the satellite communication system 206. Hence, even with significant "bits per second" speed, a satellite system may display transmission latency 226 that makes system response at the end user device 212 appear to be slower than the "bits per second" speed that the satellite communication system 206 may otherwise indicate to an end user. The slowing of the end user device 212 response times may further be exaggerated if a web page requires several upstream request/downstream reply cycles before a web page is shown. For instance, if a web page includes javascript code that has to be requested and downloaded and then the downloaded javascript code is processed and the javascript processing makes another request for an object, then there are two request cycles to effectively display one object. Another example of multiple requests needed to display a single object may occur if a web page requires the end user device to identify the web browser used before sending the web page, the latency for the upstream data identifying the web browser will be combined with the latency of actually delivering the data to the end user devices 212 such that the transmission latency 226 observed to receive the data for the requested web page is effectively doubled. For many web pages there may be several of request/response cycles before the web page is rendered on the end user device 212, effectively multiplying the transmission latency time. In addition to the bandwidth savings discussed above, the use of the remote cache 210 for a satellite communication system 206 has the additional benefit of eliminating the transmission latency 226 for each "hit" on requested data 222 found in the remote cache 210.

Figure 3:
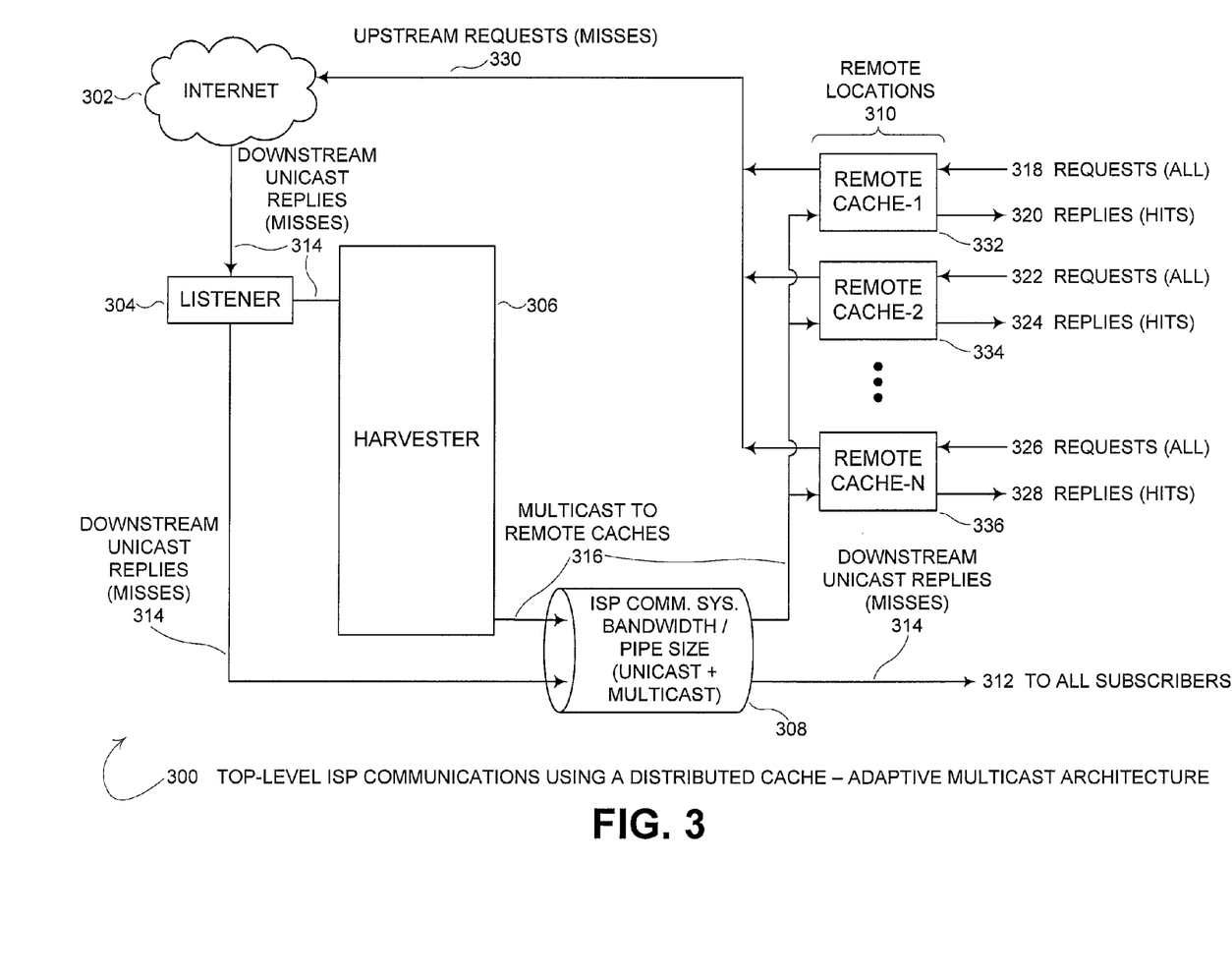
FIG. 3 is a top-level schematic illustration of ISP communications using a distributed cache-adaptive multicast architecture.

FIG. 3 is a top-level schematic illustration 300 of ISP communications using a distributed cache-adaptive multicast architecture. The remote locations 310 have remote caches 332, 334, and 336. As disclosed with respect to FIGS. 1 and 2, the remote cache 332 receives all Internet requests 318 for the location where the remote cache 332 is located. The first remote cache shown 332 replies for all hits 320 found in the remote cache without forwarding the requests for hits upstream to the Internet 302. Any requests that are misses in the remote cache 332 (i.e., data is not found in the remote cache 332) are sent to the Internet as upstream request misses 330. The second cache 334 and subsequent N caches 336 similarly receive all requests 322, 326 from the applicable remote location 310, respectively, and reply to any hits 324, 328, respectively, found in the applicable remote cache 334, 336. The second cache 334 and subsequent N caches 336 also similarly send any requests that are misses in the applicable remote cache 334, 336 (i.e., data is not found in the remote cache 334 or 336, respectively) to the Internet as upstream request misses 330. The Internet 302 handles the upstream request misses 330 and sends unicast replies to the misses downstream 314 to all subscribers/ISP clients 312 via the ISP communication system 308 where each unicast reply 314 is specifically addressed to a particular end user device/application. As disclosed with respect to FIGS. 1 and/or 2, when the remote caches 332, 334, 336 intercept and reply to requests 318, 322, 326 without the need to request information from the Internet, overall bandwidth of the ISP communication system is saved and/or the transmission latency effect experienced by users may be significantly reduced (e.g., transmission latency reduction may be particularly beneficial to Satellite based ISP communication systems).

A principal feature to determine the ultimate bandwidth savings of the embodiments is the selection of which data objects to store in the remote caches 332, 334, 336 as it is unrealistic to recreate the entire content of the Internet on each remote cache 332, 334, 336. At the ISP, a "listener" device/component/sub-system 304 listens to (i.e., monitors) the downstream replies 314 to see which data objects are being missed by the remote caches 332, 334, 336. The listener 304 merely monitors the downstream unicast reply (misses) traffic 314 without actively making changes in the downstream unicast reply (misses) traffic 314 being delivered to the ISP subscribers/clients 312. The harvester 306 records, analyzes and/or manipulates the downstream unicast reply (misses) 314 and selects requested objects to multicast to the remote caches 332, 334, 336 in order to improve the hit to miss ratio for replying to requests at the remote caches 332, 334, 336. The harvester 306 may estimate the bandwidth utilized to transmit the unicast reply (misses) 314 on the downstream portion of the ISP communication system 308 based on the monitored downstream unicast replies (misses) 314 and, in turn, calculate the available downstream bandwidth available for multicasting data objects to the remotes caches 332, 334, 336 as a difference between the maximum total downstream bandwidth available for the ISP communication system 308 and the estimated unicast bandwidth being used by the downstream unicast reply traffic 314. The harvester 306 may then prioritize the data objects to deliver to the remote caches 332, 334, 336 via multicast message 316 transported using the free/unused portion of the ISP communication system downstream bandwidth 308. Factors that may be used to prioritize the data objects to multicast 316 to the remote caches 332, 334, 336 may include, but is not limited to, the delivery cost/size of the object (typically measured in kB—kilo bytes), the Time To Live (TTL)/expiry time for an object (typically measured in seconds), the frequency that the object is being requested (typically measured in requests/second), the number of remote caches connected to the ISP communication system 308, the total maximum downstream bandwidth measured/observed for the ISP communication system 308, and the free/unused bandwidth available to multicast 316 objects to the remote caches 332, 334, 336. Various embodiments may monitor and adjust for variations in the measurements to evaluate and prioritize the data objects in real time such that the remote caches 332, 334, 336 distributed at various locations (i.e., distributed caches) are adaptively updated via multicast data 316 sent by the harvester 306 containing the most recent and high priority data objects encountered by the harvester 308.

Figure 4:
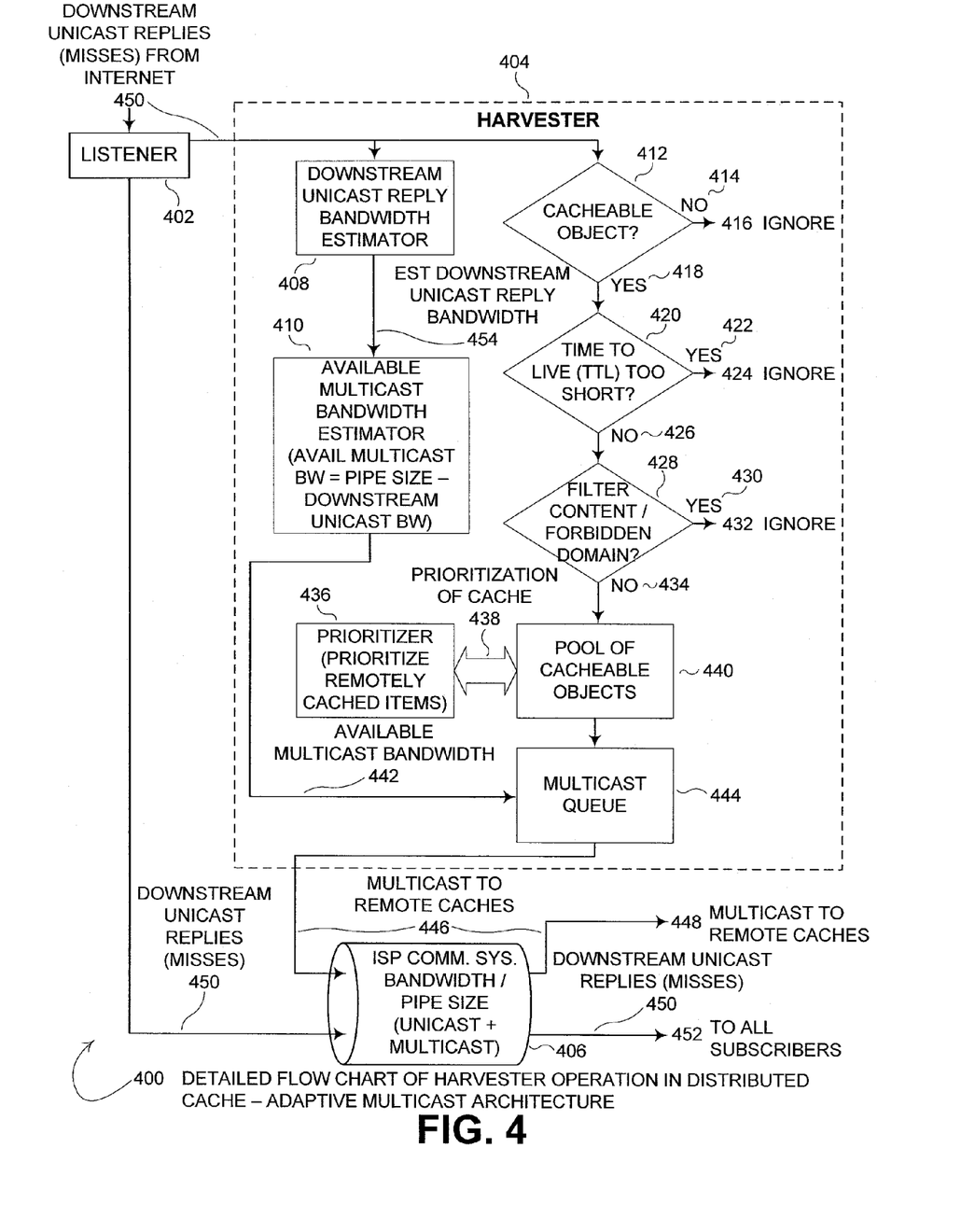
FIG. 4 is detailed flow chart/schematic illustration of the operation of the harvester in a distributed cache-adaptive multicast architecture.

FIG. 4 is detailed flow chart/schematic illustration 400 of the operation of the harvester 404 in a distributed cache-adaptive multicast architecture. As also described in the disclosure with respect to FIG. 3, the downstream unicast replies representing items missed in the remote caches 450 are sent from the Internet to all subscribers 452 via the ISP communication system 406, with each individual unicast reply addressed to a particular end user device/application. A listener 402 at the ISP supplies a copy of the downstream unicast replies (misses) 450 to the harvester 404. The harvester 404 captures/records, analyzes, and prioritizes the data objects contained in the downstream unicast replies (misses) 450. An embodiment may incorporate a number of subsystems within the harvester 404 as shown in FIG. 4. The downstream reply bandwidth estimator 408 estimates the bandwidth 454 utilized to deliver the downstream unicast replies (misses) 450. The estimated downstream unicast reply bandwidth 454 is then used in the available multicast bandwidth estimator 410 to calculate the available multicast bandwidth 442 as a difference between the estimated downstream unicast reply bandwidth 454 and the total maximum downstream bandwidth/pipe size of the ISP communication system 406. Eq. 1 represents a basic difference calculation that may be used to calculate the available downstream multicast bandwidth 442.

$$\text{Avail Multicast BW} = \text{Pipe Size} - \text{Estimated Downstream Unicast BW} \quad \text{Eq. 1:}$$

Adjustments to the estimated downstream unicast bandwidth 454 may be performed in real time such that the estimated downstream unicast bandwidth 454 and the available downstream multicast bandwidth 442 are updated on a regular basis during system operation in order to permit the harvester 404 to adjust for real time fluctuations in the bandwidth values. Various embodiments may utilize a fixed "theoretical" value of the maximum total downstream bandwidth of the ISP communication system 406 that is based on the system parameters of the ISP communication system 406. However, the actual currently available total maximum downstream bandwidth of the ISP communication system 406 may fluctuate in real time due to a variety of real world factors that may fluctuate and/or may be difficult to properly incorporate into the calculation of a theoretical total maximum downstream bandwidth value. For a satellite based ISP communication system, fluctuations in the total maximum bandwidth currently available may include: weather effects on the satellite signal, temperature effects on the satellite signal, temperature effects on the equipment, loss/addition of communication channels to the system, loss/addition of remote locations to the system, signal attenuation at the transceivers, etc.

The harvester 404 also creates a pool of cacheable objects 440 from the requested objects being delivered in the downstream unicast replies (misses) 450 monitored by the listener 402. Prior to placing a requested object into the pool of cacheable objects 440, the harvester 404 may reject/exclude objects that should not be multicasted 446 to the remote caches 448. For instance, an object may be designated as cacheable or non-cacheable in the object parameters, an object may have a TTL/expiry time that is too short for reasonable and/or efficient use at the remote caches (i.e., the object will expire before or soon after the multicast data 446 is sent to and handled by the remote caches 448), or the object may contain objectionable material from a forbidden domain. The harvester may inspect the objects in the downstream unicast replies (misses) 450 to determine if the object is cacheable 412. If the object is not cacheable 414, the object is ignored 416 and not included in the pool of cacheable objects 440. If the object is cacheable 418 and otherwise acceptable, the object may be included in the pool of cacheable objects 440. The harvester may also inspect each object's TTL/expiry time 450 to determine if the object will be valid long enough that multicasting 446 the object to the remote caches 448 may reasonably provide some bandwidth savings 420. For instance, if the TTL/expiry time is one second and it takes 1-2 seconds to multicast the object to the remote caches 448, then, by the time the object arrives at the remote caches, the object has expired and is useless to the remote cache. If the TTL/expiry time is too short, the object is ignored 424 and not included in the pool of cacheable objects 440. Further, a function of the combination of the TTL/expiry time and the content size (i.e., delivery cost) may be used to prioritize objects to multicast. For instance, a large object with a relatively short TTL/expiry time may still be worth caching while a small object with the same TTL/expiry time may not be worth caching. If the object has a sufficiently long TTL/expiry time 426 and is otherwise acceptable, the object may be included in the pool of cacheable objects 440. Further, the harvester may inspect the content of each object to determine if the object originated from a forbidden domain 428. Similar functionality may be achieved by the harvester 404 using a content filter (e.g., Net Nanny and the like) to actively inspect the data for unwanted content 428. In some circumstances, objectionable material is some of the most frequently requested material on the Internet. If an ISP does not want to deliver objectionable material to remote caches, it may be worthwhile to exclude objects with objectionable material from the pool of cacheable objects 440. Excluding objectionable material may obviate the risk of the ISP from delivering illegal objectionable content to the remote caches and/or delivering content to a subscriber/client that the client would find objectionable. If the object originated from a forbidden domain and/or an active content filter determined the content is forbidden 430, the object is ignored 430 and not included in the pool of cacheable objects 440. If the object is not objected to for content 434 and is otherwise acceptable, the object may be included in the pool of cacheable objects 440. Various embodiments may include parameters defining minimum content/delivery cost size, maximum content/delivery cost size, and a minimum TTL/expiry time for objects that may be multicasted to the remote caches 332, 334, 336. Various embodiments may also permit the user to define that only objects requested by a particular user/remote location may be stored in the remote cache 332, 334, 336 for the particular remote location. That is, the multicasted objects to cache may contain objects commonly accessed by other users/remote locations, but that are not used or desired to be cached by the particular user/remote location 33

The prioritizer 436 may then prioritize each object in the pool of cacheable objects 440 based on a calculated measure of the bandwidth savings provided by remotely caching the object. As further described in the disclosure with respect to FIG. 6, the prioritizer 436 may determine the bandwidth savings for each object as a function of the delivery cost/size of the object (typically measured in kB—kilo bytes), the Time To Live (TTL)/expiry time for an object (typically measured in seconds), and the frequency that the object is being requested (typically measured in requests/second). In addition to the above, the prioritizer may calculate the bandwidth savings for each object as a function of the number of remote caches connected to the ISP communication system and/or the total maximum downstream bandwidth measured/observed for the ISP communication system 406. Once the pool of cacheable objects 440 is prioritized, the available multicast bandwidth 442 determines how many data objects may be sent downstream in the available multicast bandwidth 442. The pool of cacheable objects 440 is added to the multicast queue 444 from highest priority to lowest priority objects based on each object's bandwidth savings until the multicast queue is full, as determined by the available multicast bandwidth 442. The estimated downstream unicast reply bandwidth 454, available multicast bandwidth 442, measured/observed total maximum downstream bandwidth of the ISP communication system 406, and the individual priorities of the objects in the pool of cacheable objects may be updated during system operation in real time such that the remotely cached items are continuously adapted to the actual subscriber/client usage patterns. An embodiment may perform the priority calculation to obtain an object's priority value using a simple equation, such as the equation given in Eq. 2 below.

$$Object priority = \frac{(Size * Scalar1) * (Frequency * Scalar2) * (TTL * Scalar3)}{Scalar4}$$ Eq. 2

The scalar 1-4 factors in Eq. 2 represent constant parameters that may be set by the ISP to meet the ISP's prioritization goals. For an embodiment implementing Eq. 2, the embodiment may also set a minimum and/or maximum for each parameter (e.g., restrict objects within a maximum and/or minimum range for delivery cost/size, frequency/requests per second, and/or the TTL/expiry time). Other relationships between the parameters may also be utilized as desired to set the priority values for each object. Also, other parameters may be incorporated into a priority function, such as the number of remote caches on the system and/or the currently available maximum ISP system communication bandwidth.

Figure 5:
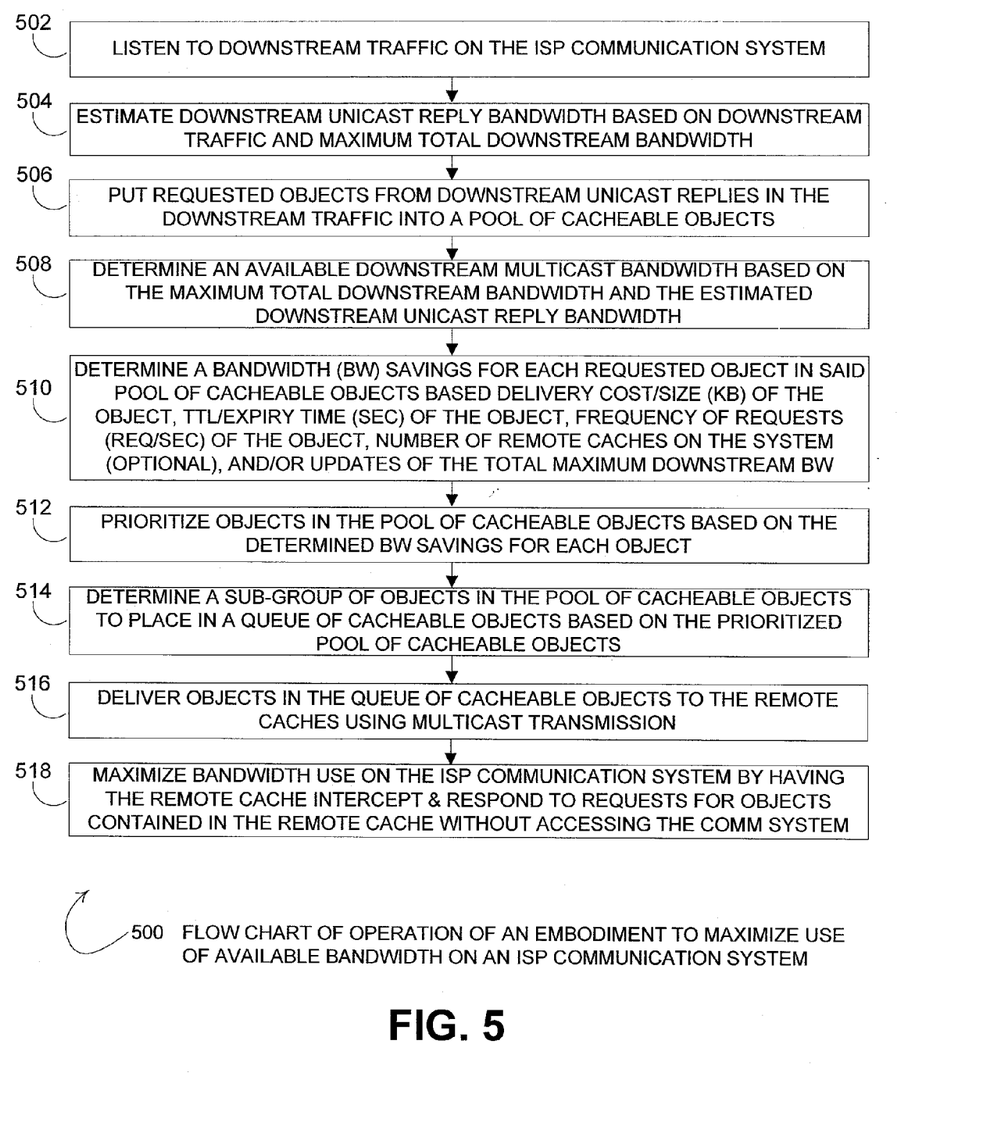
FIG. 5 is a flow chart describing the operation of an embodiment that maximizes use of available bandwidth on an ISP to ISP subscriber/client communication system.

FIG. 5 is a flow chart 500 describing the operation of an embodiment that maximizes use of available bandwidth on an ISP to ISP subscriber/client communication system. At step 502, the embodiment listens to (i.e., monitors) the downstream traffic on the ISP communication system. At step 504, the embodiment estimates the downstream unicast reply bandwidth based on the downstream unicast traffic listened to (i.e., monitored) in step 502 and the maximum total downstream bandwidth of the ISP communication system. At step 506, the embodiment places the requested objects contained in the downstream unicast replies of the downstream unicast traffic into a pool of cacheable objects. At step 508, the embodiment determines the available downstream multicast bandwidth based on the difference between the maximum total downstream bandwidth of the ISP communication system and the estimated unicast reply bandwidth from step 504. At step 510, the embodiment determines a bandwidth (BW) savings for each requested object in the pool of cacheable objects as a function of the delivery cost/size of each object (typically measured in kB—kilo bytes), the Time To Live (TTL)/expiry time for each object (typically measured in seconds), and the frequency that the object is being requested (typically measured in requests/second). In addition to the above, the embodiment may calculate the bandwidth savings for each object in the pool of cacheable objects as a function of the number of remote caches connected to the ISP communication system and/or the total maximum downstream bandwidth measured/observed for the ISP communication system. At step 512, the embodiment prioritizes the objects in the pool of cacheable objects based on the bandwidth savings for each object determined in step 510. At step 514, the embodiment determines a sub-group of objects in the pool of cacheable objects to place in a queue of cacheable objects to multicast to the remote caches as a function of the prioritized pool of cacheable objects and the available downstream multicast bandwidth. In other words, the queue of cacheable objects is filled from the highest priority objects to the lowest priority objects in the prioritized cacheable object pool of step 512 until it is determined that the queue of cacheable objects will fill the available downstream multicast bandwidth as determined at step 508. At step 516, the embodiment delivers the objects in the queue of cacheable objects to the remotes caches using multicast transmission technology. At step 518, the embodiment saves bandwidth usage on the ISP communication system by having the remote cache intercept and respond to requests for objects that are contained in the remote cache without forwarding or otherwise accessing the ISP communication system to handle the intercepted request for the objects found (hits) in the remote cache.

Figure 6:
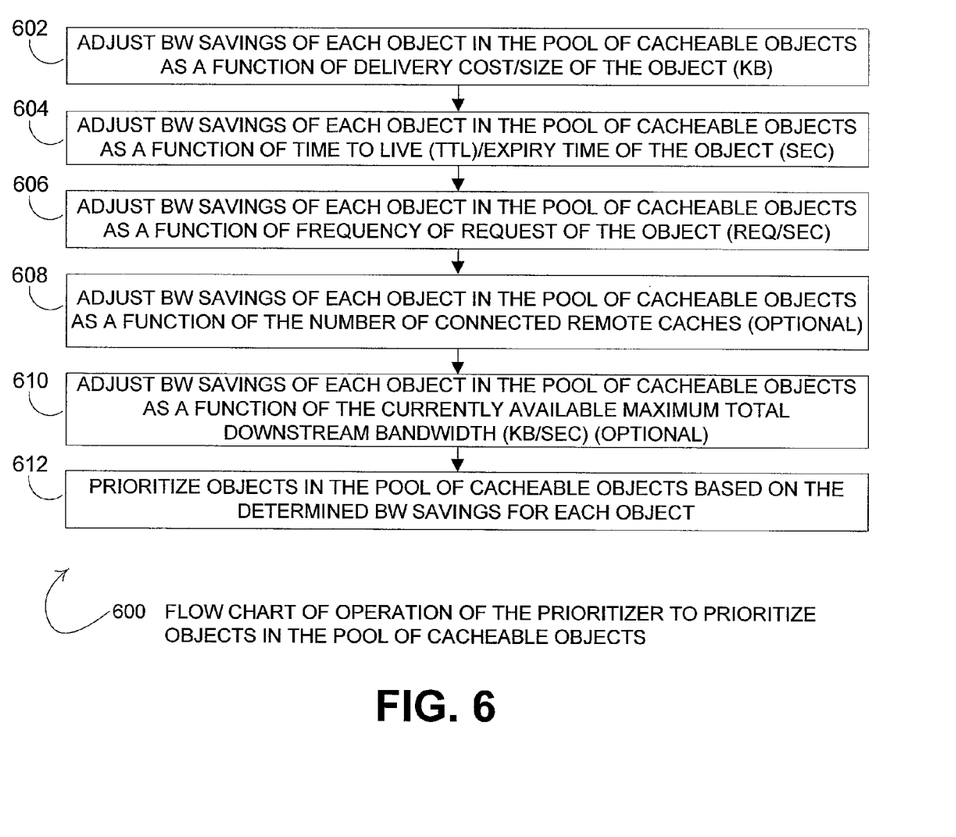
FIG. 6 is a flow chart describing operation of the prioritizer to prioritize objects in the pool of cacheable objects.

FIG. 6 is a flow chart 600 describing operation of the prioritizer to prioritize objects in the pool of cacheable objects. At step 602, the prioritizer adjusts the bandwidth savings for each object in the pool of cacheable objects as a function of the delivery cost/size of the object (typically measured in kB). At step 604, the prioritizer adjusts the bandwidth savings for each object in the pool of cacheable objects as a function of the Time To Live (TTL)/expiry time of the object (typically measured in seconds). At step 606, the prioritizer adjusts the bandwidth savings for each object in the pool of cacheable objects as a function of the frequency that the object is requested (typically measured in requests/second). At optional step 608, the prioritizer adjusts the bandwidth savings for each object in the pool of cacheable objects as a function of the number of remote caches connected to the ISP communication system. At optional step 610, the prioritizer adjusts the bandwidth savings for each object in the pool of cacheable objects as a function of the currently available maximum total downstream bandwidth (typically measured in kbps or Mbps). At step 612, the prioritizer prioritizes the objects in the pool of cacheable objects based on the determined bandwidth savings for each object.

Figure 7:
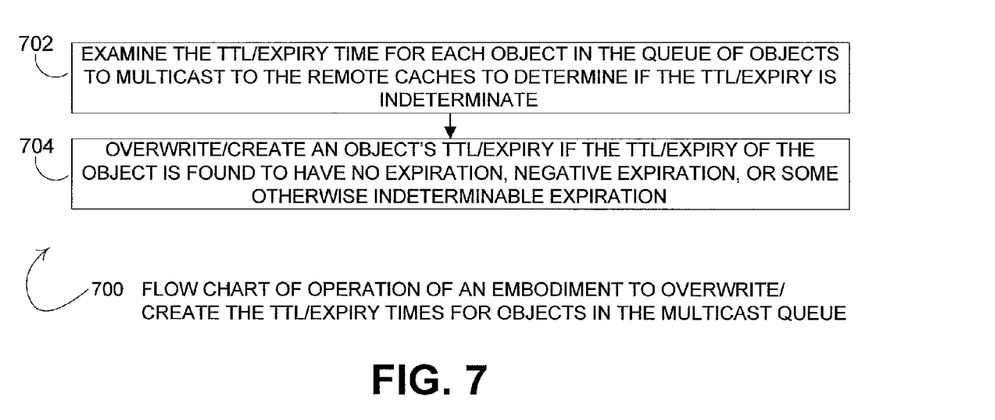
FIG. 7 is a flow chart describing operation of an embodiment to overwrite or create Time To Live (TTL)/expiry times for objects in the multicast queue.

FIG. 7 is a flow chart 700 describing operation of an embodiment to overwrite or create Time To Live (TTL)/expiry times for objects in the multicast queue. At step 702, the embodiment described in the flow chart 700 of FIG. 7 examines the TTL/expiry time for each object in the queue of objects to multicast to the remote caches in order to determine if the TTL/expiry time is indeterminate. Some potential indeterminate TTL/expiry times include objects without any TTL/expiry time defined (i.e., no TTL/expiry time), objects with an infinite TTL/expiry time, and objects that have some otherwise indeterminate TTL/expiry time. At step 704, the embodiment overwrites/creates the TTL expiry time of the object with an indeterminate TTL/expiry time with a TTL/expiry time designed to maximize the bandwidth saving effectiveness of the system while maintaining a reasonable ability to keep the objects stored in the remote caches up-to-date with any changes that may be made to the object on the originating Internet source. Many format construction objects such as lines, counters, backgrounds, etc. have been found to have indeterminate TTL/expiry times. The format construction objects were often not cached because the TTL/expiry time indicated that the object need be refreshed each time a web page was accessed. By updating the TTL/expiry time to a measureable TTL/expiry time for objects with indeterminate TTL/expiry times, it was found that the format construction type objects could be effectively cached at the remote cache. Thus, with the indeterminate TTL/expiry time objects cached, bandwidth needed to download objects that rarely change is saved. Further, for systems where transmission latency is an issue (e.g., satellite), the remote cache is able to intercept the repeated accesses to the same object and save significant time due to latency concerns. Further, many times a web site will repeatedly check the TTL/expiry time for objects with indeterminate TTL/expiry times and providing a determinable TTL/expiry time eliminates much of the need to continually check for an update of the TTL/expiry times.

The various embodiments may also combine a predefined list of known objects with the actively adapted object queue provided for multicasting to the remote queues by the harvester. A predefined list may provide the ability to regularly keep a list of objects known to be popular even if there may be a real time lull in the access of the objects on the list. Further, the predefined list may provide an additional ability for ISP subscriber/clients to define a list of objects the subscriber/client desires to be cached.

Various embodiments may provide the control and management functions detailed herein via an application operating on a computer system (or other electronic devices). Embodiments may be provided as a computer program product which may include a computer-readable, or machine-readable, medium having stored thereon instructions which may be used to program/operate a computer (or other electronic devices) or computer system to perform a process or processes in accordance with the present invention. The computer-readable medium may include, but is not limited to, hard disk drives, floppy diskettes, optical disks, Compact Disc Read-Only Memories (CD-ROMs), Digital Versatile Disc ROMS (DVD-ROMs), Universal Serial Bus (USB) memory sticks, magneto-optical disks, ROMs, random access memories (RAMs), Erasable Programmable ROMs (EPROMs), Electrically Erasable Programmable ROMs (EEPROMs), magnetic optical cards, flash memory, or other types of media/machine-readable medium suitable for storing electronic instructions. The computer program instructions may reside and operate on a single computer/electronic device or various portions may be spread over multiple computers/devices that comprise a computer system. Moreover, embodiments may also be downloaded as a computer program product, wherein the program may be transferred from a remote computer to a requesting computer by way of data signals embodied in a carrier wave or other propagation medium via a communication link (e.g., a modem or network connection, including both wired/cabled and wireless connections).

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for communication by an Internet Service Provide (ISP) in a communication system, said ISP connected to at least one remote location having a remote cache via an ISP communication system, said method comprising:
   identifying, at a computerized harvester of said ISP, a pool of cacheable objects based on downstream unicast communication traffic, said pool of cacheable objects being requested objects contained in downstream unicast replies of said downstream unicast communication traffic of said ISP communication system;
   prioritizing, at a computerized prioritizer of said ISP, said pool of cacheable objects based at least in part on a bandwidth savings from remote caching of each requested object in said pool of cacheable objects;
   determining a sub-group of said requested objects in said pool of cacheable objects to place in a queue of multicast cacheable objects to multicast to said remote cache at said at least one remote location based on said prioritized pool of cacheable objects and an available downstream multicast bandwidth of said ISP communication system; and
   delivering objects in said multicast queue to said remote cache at said at least one remote location using downstream multicast transmissions via said ISP communication system based on said available downstream multicast bandwidth of said ISP communication system, said delivered objects for use by said remote cache in intercepting upstream requests from said at least one remote location for objects and responding to said intercepted upstream requests with replies containing corresponding delivered objects contained in said remote cache.

2. The method of claim 1, further comprising:
   determining, at said computerized harvester, said bandwidth savings from remote caching of each requested object in said pool of cacheable objects based at least in part on a delivery cost/size of each requested object, a Time To Live (TTL)/expiry time of each requested object, or a frequency of request for each requested object, or a combination thereof.

3. The method of claim 2, wherein said determining of said bandwidth savings from remote caching for each requested object in said pool of cacheable objects is further a function of a number of remote caches connected to said ISP communication system, said number of remote caches indicating a number of remote locations with said remote cache connected to said ISP communication system.

4. The method of claim 2, wherein said determining of said bandwidth savings from remote caching for each requested object in said pool of cacheable objects is further a function of a maximum total downstream bandwidth currently available to said ISP communication system.

5. The method of claim 2, wherein said determining of said bandwidth savings from remote caching of each requested object further comprises:
applying a weighting factor to one or more of said delivery cost/size of each requested object, said Time To Live (TTL)/expiry time of each requested object, or said frequency of request for each requested object.

6. The method of claim 1, wherein said pool of cacheable objects excludes objects designated as not being cacheable, objects with a Time To Live (TTL)/expiry time determined to be too short to deliver to said remote cache at said at least one remote location, objects originating from a domain forbidden to be cached, or objects designated as undesirable by a content control filter actively monitoring said requested objects monitored in said downstream unicast communication traffic, or a combination thereof.

7. The method of claim 1 further comprising combining a predefined list of objects with said requested objects monitored in said downstream unicast communication traffic in said pool of cacheable objects.

8. The method of claim 1 further comprising:
examining said Time To Live (TTL)/expiry time of each requested object in said queue of multicast cacheable objects to determine if said Time To Live (TTL)/expiry time of each requested object in said queue of multicast cacheable objects is indeterminate; and
overwriting/creating said Time To Live (TTL)/expiry time in a requested object contained in said queue of multicast cacheable objects with a pre-defined replacement expiry time if said Time To Live (TTL)/expiry time of said requested object contained in said queue of multicast cacheable objects is found to have no expiration, negative expiration, or some otherwise indeterminable expiration.

9. The method of claim 1, wherein said ISP communication system connects to at least one additional remote location that does not have a remote cache.

10. The method of claim 1, wherein said at least one remote location restricts storage of objects in said remote cache of said at least one remote location to objects requested by said at least one remote location and not other remote locations.

11. A distributed cache adaptive multicast system for use with an Internet service provider (ISP) communication system connecting at least one remote location to an ISP, said at least one remote location having a remote cache, said distributed cache adaptive multicast system comprising:
a harvester subsystem that identifies a pool of cacheable objects based on downstream unicast communication traffic, said pool of cacheable objects being requested objects contained in downstream unicast replies of said downstream unicast communication traffic of said ISP communication system;
a prioritizer subsystem that prioritizes said pool of cacheable objects based at least in part on a bandwidth savings from remote caching of each requested object in said pool of cacheable objects;
a multicast queue subsystem that determines a sub-group of said requested objects in said pool of cacheable objects to place in a queue of multicast cacheable objects to multicast to said remote cache at said at least one remote location based on said prioritized pool of cacheable objects and an available downstream multicast bandwidth of said ISP communication system; and
a multicast delivery subsystem that delivers objects in said multicast queue to said remote cache at said at least one remote location using downstream multicast transmissions via said ISP communication system based on said available downstream multicast bandwidth of said ISP communication system, said delivered objects for use by said remote cache in intercepting upstream requests from said at least one remote location for objects and responding to said intercepted upstream requests with replies containing corresponding delivered objects contained in said remote cache.

12. The distributed cache adaptive multicast system of claim 11, wherein said harvester subsystem determines said bandwidth savings from remote caching of each requested object in said pool of cacheable objects based at least in part on a delivery cost/size of each requested object, a Time To Live (TTL)/expiry time of each requested object, or a frequency of request for each requested object, or a combination thereof.

13. The distributed cache adaptive multicast system of claim 12, wherein said harvester subsystem determines said bandwidth savings from remote caching for each requested object in said pool of cacheable objects further as a function of a number of remote caches connected to said ISP communication system, said number of remote caches indicating a number of remote locations with said remote cache connected to said ISP communication system.

14. The distributed cache adaptive multicast system of claim 12, wherein said harvester subsystem determines said bandwidth savings from remote caching for each requested object in said pool of cacheable objects further as a function of a maximum total downstream bandwidth currently available to said ISP communication system.

15. The distributed cache adaptive multicast system of claim 12, wherein said harvester subsystem determines said bandwidth savings from remote caching of each requested object further based on a weighting factor applied to one or more of said delivery cost/size of each requested object, said TTL/expiry time of each requested object, or said frequency of request for each requested object.

16. The distributed cache adaptive multicast system of claim 11, wherein said pool of cacheable objects excludes objects designated as not being cacheable, objects with a Time To Live (TTL)/expiry time determined to be too short to deliver to said remote cache at said at least one remote location, objects originating from a domain forbidden to be cached, or objects designated as undesirable by a content control filter actively monitoring said requested objects monitored in said downstream unicast communication traffic, or a combination thereof.

17. The distributed cache adaptive multicast system of claim 11, further comprising a predefined list subsystem that combines a predefined list of objects with said requested objects monitored in said downstream unicast communication traffic in said pool of cacheable objects.

18. The distributed cache adaptive multicast system of claim 11, further comprising:
an expiry update subsystem that examines said Time To Live (TTL)/expiry time of each requested object in said queue of multicast cacheable objects to determine if said Time To Live (TTL)/expiry time of each requested object in said queue of multicast cacheable objects is indeterminate; and overwrites/creates said Time To Live (TTL)/expiry time in a requested object contained in said queue of multicast cacheable objects with a predefined replacement expiry time if said Time To Live (TTL)/expiry time of said requested object contained in said queue of multicast cacheable objects is found to have no expiration, negative expiration, or some otherwise indeterminable expiration.

19. The distributed cache adaptive multicast system of claim 11, wherein said ISP communication system connects to at least one additional remote location that does not have a remote cache.

20. A computer program product for distributed cache adaptive multicasting at an Internet service provider (ISP), said ISP connected to at least one remote location having a remote cache via an ISP communication system, comprising:
a non-transitory computer-readable medium, comprising code for:
identifying, at a computerized harvester of said ISP, a pool of cacheable objects based on downstream unicast communication traffic, said pool of cacheable objects being requested objects contained in downstream unicast replies of said downstream unicast communication traffic of said ISP communication system;
prioritizing, at a computerized prioritizer of said ISP, said pool of cacheable objects based at least in part on a bandwidth savings from remote caching of each requested object in said pool of cacheable objects;
determining a sub-group of said requested objects in said pool of cacheable objects to place in a queue of multicast cacheable objects to multicast to said remote cache at said at least one remote location based on said prioritized pool of cacheable objects and an available downstream multicast bandwidth of said ISP communication system; and
delivering objects in said multicast queue to said remote cache at said at least one remote location using downstream multicast transmissions via said ISP communication system based on said available downstream multicast bandwidth of said ISP communication system, said delivered objects for use by said remote cache in intercepting upstream requests from said at least one remote location for objects and responding to said intercepted upstream requests with replies containing corresponding delivered objects contained in said remote cache.

* * * * *